US006181415B1

United States Patent
Kanazawa et al.

(10) Patent No.: US 6,181,415 B1
(45) Date of Patent: Jan. 30, 2001

(54) POSITION SENSOR FOR TRANSMISSION TYPE OPTICAL DEFLECTOR AND APPARATUS FOR CORRECTING SCANNING POSITION OF SCANNING OPTICAL SYSTEM

(75) Inventors: Hiroshi Kanazawa, Saitama; Akihiro Tanaka, Kanagawa; Mitsunori Iima, Saitama, all of (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/427,685

(22) Filed: Oct. 27, 1999

Related U.S. Application Data

(62) Division of application No. 09/118,005, filed on Jul. 17, 1998, now Pat. No. 6,014,205.

(30) Foreign Application Priority Data

Jul. 18, 1997 (JP) .................................................... 9-193861
Jul. 22, 1997 (JP) .................................................... 9-195851

(51) Int. Cl.⁷ ................................................ G02B 26/08
(52) U.S. Cl. .......................................... 356/73; 359/211
(58) Field of Search .................. 356/375, 73; 369/44.12, 369/44.11, 44.14, 44.23, 44.39, 112; 359/211, 209, 216; 250/234, 201.5, 216

(56) References Cited

U.S. PATENT DOCUMENTS

| 4,326,799 | 4/1982 | Keene et al. . |
|---|---|---|
| 4,600,837 | 7/1986 | Distefano et al. . |
| 4,850,786 | 7/1989 | Morimoto et al. . |
| 5,045,679 | 9/1991 | Suzuki et al. . |
| 5,760,944 | 6/1999 | Minakuchi et al. . |
| 5,920,140 | 7/1999 | Nakagishi et al. . |
| 5,926,307 | 7/1999 | Tanaka et al. . |
| 5,966,253 | 10/1999 | Tanaka et al. . |
| 6,014,205 | 1/2000 | Kanazawa et al. . |

FOREIGN PATENT DOCUMENTS

| 084728 | 8/1983 | (EP) . |
|---|---|---|
| 448362 | 9/1991 | (EP) . |
| 515252 | 11/1992 | (EP) . |

OTHER PUBLICATIONS

English language abstract of EP 448 362.
English language abstract of EP 515–252.

*Primary Examiner*—Frank G. Font
*Assistant Examiner*—Tu T. Nguyen
(74) *Attorney, Agent, or Firm*—Greenblum & Bernstein, P.L.C.

(57) ABSTRACT

A position sensor is provided for a transmission deflector which has a wedge-shaped transmission prism that is rotatably supported by a yoke member through a prism holder and an elastic member, and rotates in the forward and reverse directions via electromagnetic operation. A coated reflection layer is provided on a surface of the wedge-shaped transmission prism other than the transmission portion thereof through which the light can pass. A light emitter for emitting collimated light onto the reflection layer and an incident position detector for receiving the light reflected by the reflection layer and detecting the incident position of the light thereon are provided on the yoke member or a member integral therewith.

5 Claims, 14 Drawing Sheets

POSITION SENSOR FOR TRANSMISSION TYPE OPTICAL DEFLECTOR AND APPARATUS FOR CORRECTING SCANNING POSITION OF SCANNING OPTICAL SYSTEM

This is a division of U.S. patent application Ser. No. 09/118,005, filed Jul. 17, 1998, now U.S. Pat. No. 6,014,205, the contents of which are expressly incorporated by reference herein in its entirety.

BACKGROUND OF THE INVENTION

1. Field of the Invention

The present invention relates to an optical transmission deflector in which light is deflected by a prism which is mechanically driven via electromagnetic operation, and in particular it relates to a position sensor for detecting the position thereof. The present invention also relates to an optical scanner and a correction apparatus for correcting the scanning position in the sub-scanning direction.

This application is related to the commonly assigned application filed on Jun. 16 1998, entitled "TRANSMISSION TYPE OPTICAL DEFLECTOR", the disclosure of which is expressly incorporated by reference herein.

2. Description of the Related Art

In a known optical deflector in which an optical element is mechanically driven co deflect light, a mirror which is adapted to deflect light is reciprocally moved or the mirror is rotated. A galvano mirror is one of the typical first type in which the mirror is reciprocally moved. A polygonal mirror is another way of providing an optical deflector in which the mirror is rotated. In theory, a transmission deflector can be realized, for example, by employment of a wedge-shaped prism in place of the galvano mirror. However, in practice, since the wedge-shaped prism is heavier than the planar mirror and the position of the center of gravity of the prism varies depending on the shape thereof, oscillation tends to occur due to a weight imbalance, thus leading to difficulty in realizing a precise and high-speed optical deflector.

To this end, the assignee of the present application has proposed a precise and fast-driven optical transmission deflector using a prism (Japanese Patent Application No. 9-159932). In the proposed optical transmission deflector, the thick portion of the transmission prism is partly cut away so that the position of the center of gravity of the transmission prism is located on the axis about which the transmission prism swings.

In conventional optical scanners which have been widely used in a laser printer, etc., the laser beam emitted from a laser source and modulated in accordance with drawing data (printing data) is made incident upon the polygonal mirror (optical deflector) and is moved in the main scanning direction. The scanning laser beam is made incident upon a photosensitive body which is moved in the sub-scanning direction perpendicular to the main scanning direction through an fθ lens. The photosensitive body is made of, for example, a photosensitive drum or a photosensitive sheet.

In conventional optical scanners, positional deviation of the laser beam on the photosensitive body in the sub-scanning direction tends to occur due to an irregularity in the movement of the photosensitive body or a slim inclination of the reflection surfaces of the polygonal mirror, etc., thus leading to a deteriorated printing quality. The correction of the scanning position in the sub-scanning direction is carried out by the reflection type optical deflector, such as a galvano mirror. However, in the related art in which the reflection type correction system has been only employed, freedom of design is restricted and the size of the optical scanner is increased.

SUMMARY OF THE INVENTION

It is an object of the present invention to provide a position sensor for a transmission type optical deflector that uses a prism, which can detect the position of the transmission prism.

Another object of the present invention is to provide a scanning position correcting apparatus for a transmission type optical deflector, which can correct the scanning position in the sub-scanning direction.

Still another object of the present invention is to provide a scanning position correcting apparatus in which chromatic aberrations can be compensated.

According to an aspect of the present invention, there is provided a position sensor for a transmission type optical deflector, including: a prism holder supported by a yoke member to rotate about a principal axis through an elastic member; a wedge-shaped transmission prism provided on the prism holder to transmit and refract light; a coil and a permanent magnet which are provided on the prism holder and the yoke member, respectively, to produce a rotational motion of the prism holder in the forward and reverse directions about the principal axis via electromagnetic operation; a reflection layer which is coated on a surface of the wedge-shaped transmission prism other than the transmission portion thereof through which the light can pass; a light emitter for emitting collimated light onto the reflection layer; and an incident position detector for receiving the light reflected by the reflection layer and detecting the incident position of the light thereon.

Preferably, the reflection layer is formed on the thinner portion of the wedge-shaped transmission prism.

Preferably, the wedge-shaped transmission prism is partly cut away at the thicker portion thereof so that the center of gravity of the wedge-shaped transmission prism is substantially the same as the principal axis in which the principal axis appears as a point and the wedge-shaped transmission prism appears as a wedge-shape in section, and the reflection layer is formed on an incident or emission surface of the thinner portion of the wedge-shaped transmission prism that is opposed to the cut-away portion.

Preferably, the light emitter includes a laser diode and a collimating lens which collimates the laser light emitted from the laser diode and wherein the incident position detector includes a condenser lens and an optical position detector.

According to another aspect of the present invention, there is provided a scanning position correcting apparatus for an optical scanning system, including: a laser source whose output is modified in accordance with drawing data; an optical deflector (e.g , polygonal mirror)) which moves the laser light emitted from the laser source in a main scanning direction; a photosensitive body which is driven in a sub-scanning direction perpendicular to the main scanning direction and which receives the laser light moved in the main scanning direction; a pair of wedge-shaped transmission prisms provided in a light path between the laser source and the optical deflector, the wedge-shaped transmission prisms having a wedge shape in section in the sub-scanning direction and are oriented in opposite directions, one of the wedge-shaped transmission prisms is stationary and the other wedge-shaped transmission prism is rotatable about a principle axis perpendicular to the sub-scanning direction; and an electromagnetic drive device which rotates the rotatable transmission prism about the principle axis.

In an embodiment of this aspect of the present invention, the electromagnetic drive device includes: a yoke member; a prism holder which is supported by the yoke member to rotate about the principal axis through an elastic member and on which the rotatable transmission prism is provided and; a coil and a permanent magnet provided on the prism holder and the yoke member, respectively, to produce rotational motion of the prism holder in the forward and reverse directions about the principal axis via electromagnetic operation. The stationary transmission prism is secured to the yoke member or a member integral therewith.

Preferably, the rotatable transmission prism is partly cut away at the thicker portion thereof so that the center of gravity of the rotatable transmission prism is substantially the same as the principal axis thereof in which the principal axis appears as a point and the rotatable transmission prism appears as a wedge-shape in section.

Preferably, the electromagnetic drive device drives the rotatable transmission prism in accordance with data on the irregular movement of the photosensitive body.

Preferably, the optical deflector includes a polygonal mirror and wherein the electromagnetic drive device drives the rotatable transmission prism in accordance with inclination data of the reflection surfaces of the polygonal mirror.

Preferably, the stationary transmission prism and the rotatable transmission prism have substantially the same wedge shape.

The present disclosure relates to subject matter contained in Japanese Patent Applications Nos. 9-193861 (filed on Jul. 18, 1997) and 9-195851 (filed on Jul. 22, 1997) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

An optical scanner to which a scanning position correction apparatus and a position sensor according to the present invention are applied will be described below with reference to FIGS. 12 through 15.

The illustrated embodiment is applied to a multiple beam scanner in which eight laser beams are moved at one time, that is, eight scanning beams are formed in one scanning operation. In the following discussion, the "main scanning direction" refers to a scanning direction of the scanning beams and the "sub-scanning direction" refers to a direction perpendicular to the main scanning direction.

Figure 12:
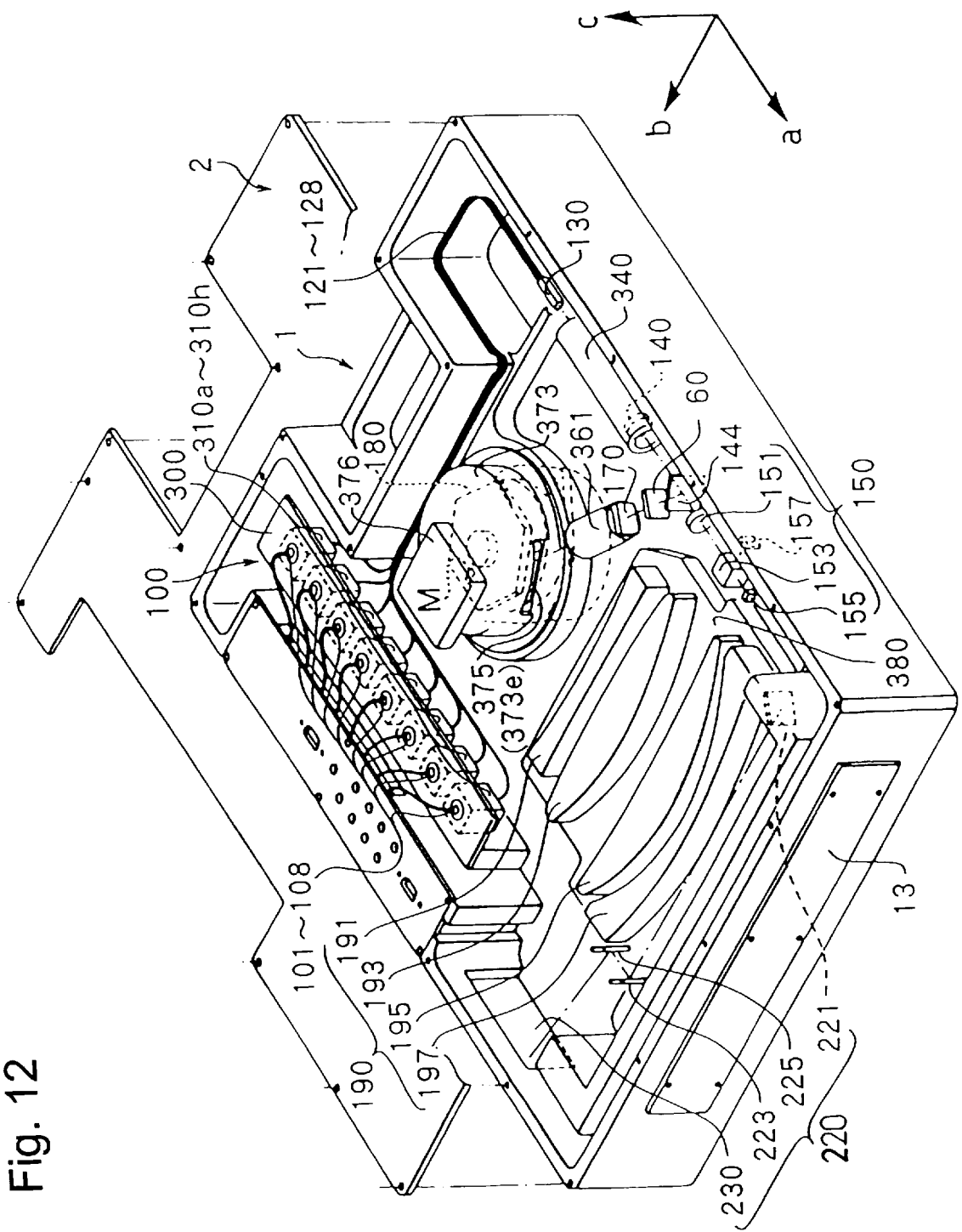
FIG. 12 is a perspective view of a multiple beam optical scanner in which a scanning position correcting apparatus and a position sensor for a transmission type optical deflector are provided, according to an embodiment of the present invention.

The optical scanner is comprised of a scanning optical system provided in a casing 1 in the form of a substantially rectangular parallelepiped, as shown in FIG. 12. The upper opening of the casing 1 is closed by an upper lid 2 when the scanner is in use.

Figure 13:
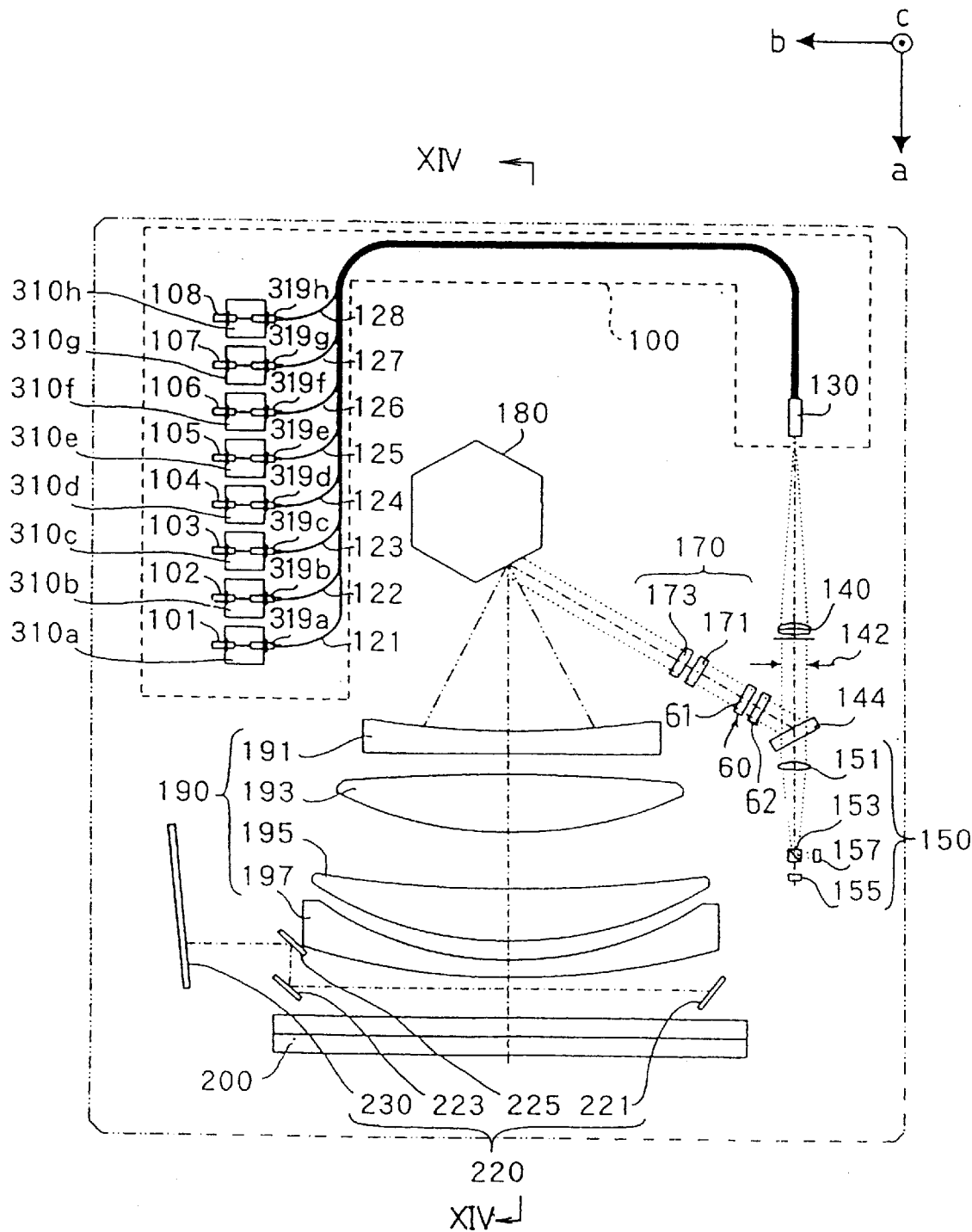
FIG. 13 is a plan view of FIG. 12.
Figure 14:
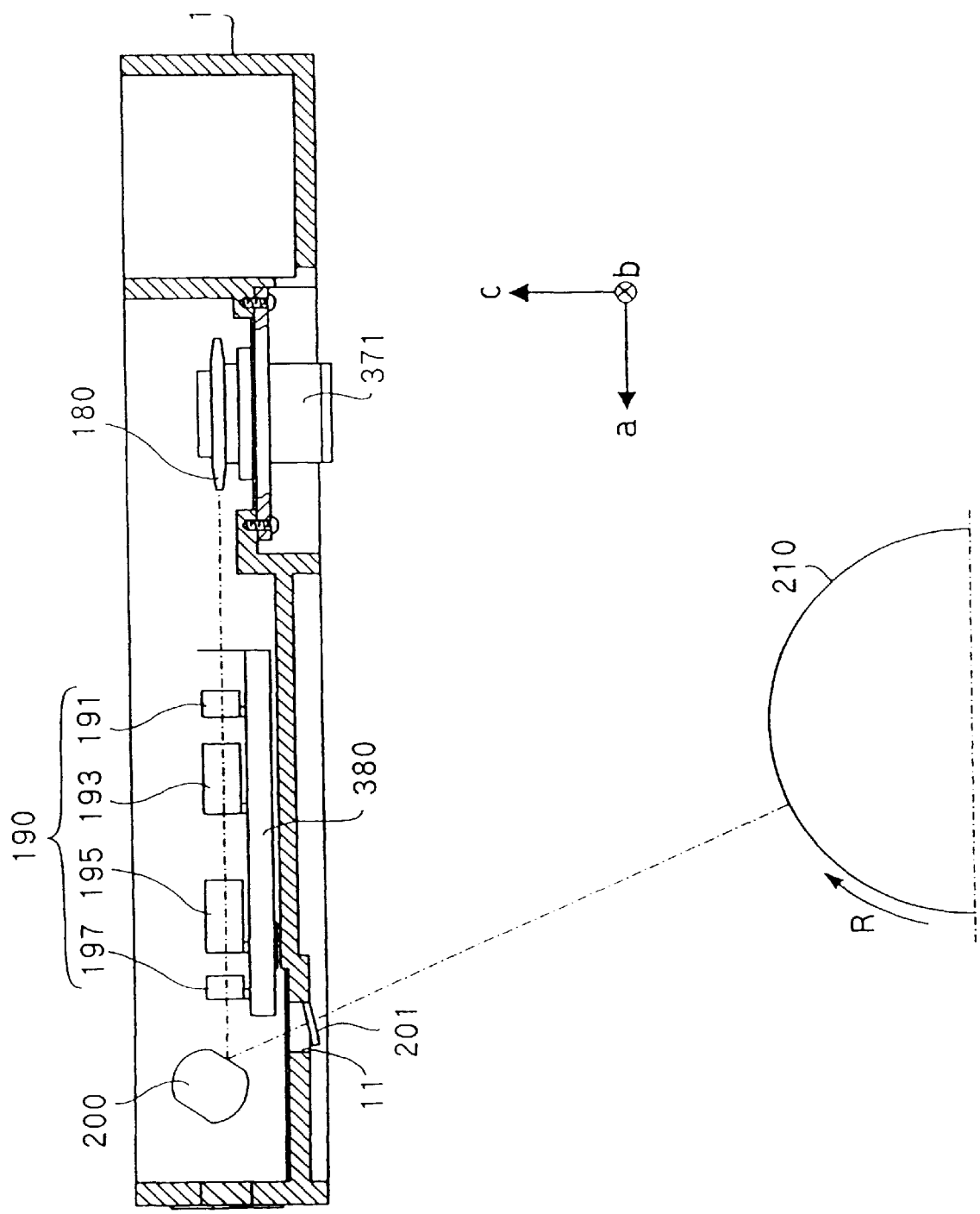
FIG. 14 is a sectional view taken along the line XIV—XIV in FIG. 13.
Figure 15:
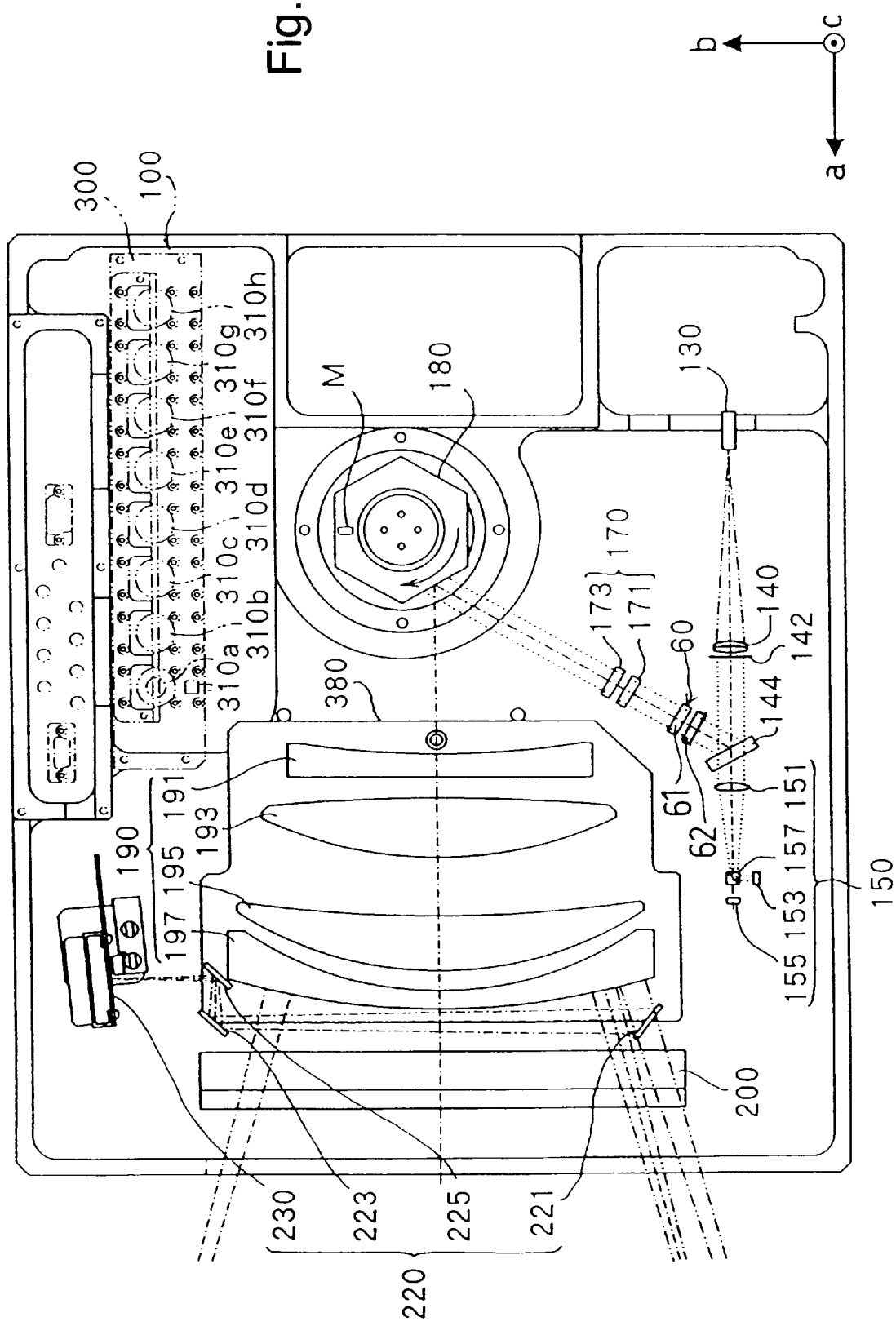
FIG. 15 is a plan view of an optical system of an apparatus shown in FIG. 12; and, FIG. 16 is a schematic view of a light path of a stationary transmission prism and a movable transmission prism.

A light source 100 for the scanning system is composed of eight laser blocks 310a through 310h mounted to a support plate 300, semiconductor lasers 101 through 108 mounted to the respective laser blocks, coupling lenses (not shown) through which the laser beams emitted from the semiconductor lasers are made incident upon respective optical fibers 121 through 128 of silica glass, and a fiber alignment block 130 on which the eight optical fibers are held and aligned at the output ends thereof to form eight point light sources, as shown in FIGS. 13 through 15. The optical fibers 121 through 128 are held at their input ends by fiber holders 319a through 319h secured to the laser blocks 310a through 310h.

The divergent light emitted from the fiber alignment block 130 of the light source 100 is collimated by a collimating lens 140 which is held by a cylindrical collimating lens holder 340 and is made incident upon a half mirror 144 which constitutes a beam splitter through a slit 142. The light is partly transmitted through the half mirror 144 to provide monitor light and is partly reflected as principal light by the half mirror 144. The transmittance of the half mirror 144 is in the range of 5 to 10% on average for P-polarized light and S-polarized light.

The monitor light transmitted through the half mirror 144 is made incident upon an APC (Automatic Power Control) signal detector 150 which constitutes a light detection means and a light correction means of a light intensity control apparatus. The APC signal detector 150 is comprised of a condenser lens 151 which converges the transmission light, a polarization beam splitter 153 which splits the transmission light into two orthogonal polarized light components, an APC first light receiving element 155 which detects optical energy of one of the polarized light components, and an APC second light receiving element 157 which detects optical energy of the other polarized light component. The output signal of the APC signal detector 150 is used for a feedback control of the outputs of the semiconductor lasers 101 through 108.

The principal light reflected by the half mirror 144 is transmitted through an electromagnetically driven transmission deflector 60 having a rotatable transmission prism 61 and a stationary transmission prism 62 and is thereafter converged onto a mirror surface of a polygonal mirror 180 or in the vicinity thereof by a cylindrical lens 170 having positive power only in the sub-scanning direction to form a line image. The rotatable transmission prism 61 of the transmission deflector 60 is rotated about an axis perpendicular to the optical axis to correct a positional deviation of the beam spot on the surface to be scanned in the sub-scanning direction, due to an irregular rotation of the photosensitive drum, etc. The angular position of the rotatable transmission prism 61 is detected by a position sensor which will be discussed hereinafter. The cylindrical lens 170 is held by a cylindrical lens holder 361 (FIG. 12) and is composed of two lens elements 171 and 173 which have respectively positive power and negative power in the sub-scanning direction, as shown in FIG. 13.

As may be seen in FIG. 14, the polygonal mirror 180 is driven to rotate in the clockwise direction as indicated by an arrow in FIG. 15 by a polygonal mirror motor 371 secured to the casing 1. The polygonal mirror 180 is isolated from the air outside by a polygonal mirror cover 373 in the form of a cup having a hole 373e which defines a light path and which is covered by a glass cover 375, as shown in FIG. 12, so that no whizzing sound be produced by the current of air caused by the rotation of the polygonal mirror 180 or no mirror surface can be damaged by foreign matter such as dust which would otherwise collide with the mirror surface.

The light transmitted through the cylindrical lens 170 is transmitted through the glass cover 375; is reflected and deflected by the polygonal mirror 180; and is emitted outside again through the glass cover 375. A sensor block 376 including a polygonal mirror sensor (index sensor, not shown) to detect a mark M provided on the upper surface of the polygonal mirror 180 is provided above the polygonal mirror cover 373. The index sensor generates, for example, one pulse for one rotation of the polygonal mirror 180.

The reflection surfaces of the polygonal mirror 180 may have, for example, surface error in the main scanning direction, caused during the production process. In general, the amount of the surface error is not identical for all the reflection surfaces. To this end, the amount of the surface error of each reflection surface is measured and stored in advance, so that it is possible to correct the beam position or light intensity depending on the inherent error amount of each reflection surface by identifying the reflection surface which is being used, based on the output of the sensor.

The light reflected by the polygonal mirror 180 is transmitted through an fθ lens 190 which forms an image forming optical system and is reflected by a reflection mirror 200 as shown in FIGS. 13 and 14 toward the photosensitive drum 210 to form eight beam spots thereon. The beam spots are simultaneously moved in accordance with the rotation of the polygonal mirror 180 to form eight scanning beams, so that the photosensitive drum 210 can be scanned with the eight scanning beams in one scanning operation. The fθ lens 190 includes first, second, third and fourth lens elements 191, 193, 195 and 197.

The photosensitive drum 210 is rotated in the direction R in synchronization with the movement of the scanning beam spots to form an electrostatic latent image on the photosensitive drum 210. The latent image is transferred onto a paper (not shown) via electrophotography per se known.

In FIGS. 12 through 15, the axis "a" is parallel with the optical axis of the fθ lens 190, and the axes "b" and "c" are orthogonal to each other in a plane perpendicular to the axis "a". The axis "b" extends in the main scanning direction and the axis "c" extends in the sub-scanning direction in the light path between the polygonal mirror 180 and the reflection mirror 200.

The light transmitted through the fθ lens 190 is detected by a synchronization signal detecting optical system 220 for each scanning operation via each reflection surfaces of the polygonal mirror prior to reaching the drawing area. The synchronization signal detecting optical system 220 composed of a first mirror 221 which is arranged in the light path between the fourth lens 197 of the fθ lens 190 and the reflection mirror 200 to reflect the light before the drawing area, second and third mirrors 223 and 225 which successively reflect the light reflected by the first mirror 221, and a light receiving element 230 which receives the light reflected by the third mirror 225. The light receiving element 230 is disposed at a position optically equivalent to the photosensitive drum 210. The eight scanning beams are successively incident upon the light receiving element 230 in accordance with the scanning operation, so that the light receiving element 230 generates eight pulses for one scanning operation. Upon detection of the pulses, image data for one line is transferred to the driver which drives the semiconductor laser corresponding to the pulses, so that the image is recorded after the lapse of a predetermined time from the detection of the pulses.

The casing 1 is provided with a drawing opening 11 through which the light reflected by the reflection mirror 200 passes. The drawing opening 11 is covered by a glass cover 201.

FIGS. 1 through 10 show the transmission deflector 60 having a position sensor, used in the scanning apparatus mentioned above.

In FIGS. 1 through 4, a yoke member (base member) 10 made of a magnetic material is provided with a cylindrical portion 10C in which a cylindrical prism holder 12 holds the rotatable transmission prism 61 secured thereto.

The prism holder 12 is elastically supported to rotate about a swing axis (principal axis or Z-axis) through an elastic member 22 which connects the cylindrical portion 10C and the prism holder 12. The principal axis Z extends perpendicularly to the light path extending from the half mirror 144 to the polygonal mirror 180.

The rotatable transmission prism 61 supported by the prism holder 12 has a uniform cross section of wedge-shape in the sub-scanning direction and the thickness thereof is increased toward the upper end. The wedge-shaped prism 61 is non-circular in a front elevational view. Namely, the prism 61 is obtained by cutting away an upper part of a circular prism, along a cutting line 61'. The position of the cutting line 61' is determined such that the center of gravity X of the wedge-shaped prism 61 is identical to the principal axis z. Namely, the wedge-shaped prism 61 which is non-circular in the front elevational view has the center of gravity X which is located on the principal axis z which extends in the lateral direction thereof in the front elevation. In a section in which the principal axis Z is represented by a point and the prism 61 exhibits a wedge shape, the center of gravity X is located on the principal axis Z. The cutting line 61' of the prism 61 extends in parallel with the principal axis z.

Figure 1:
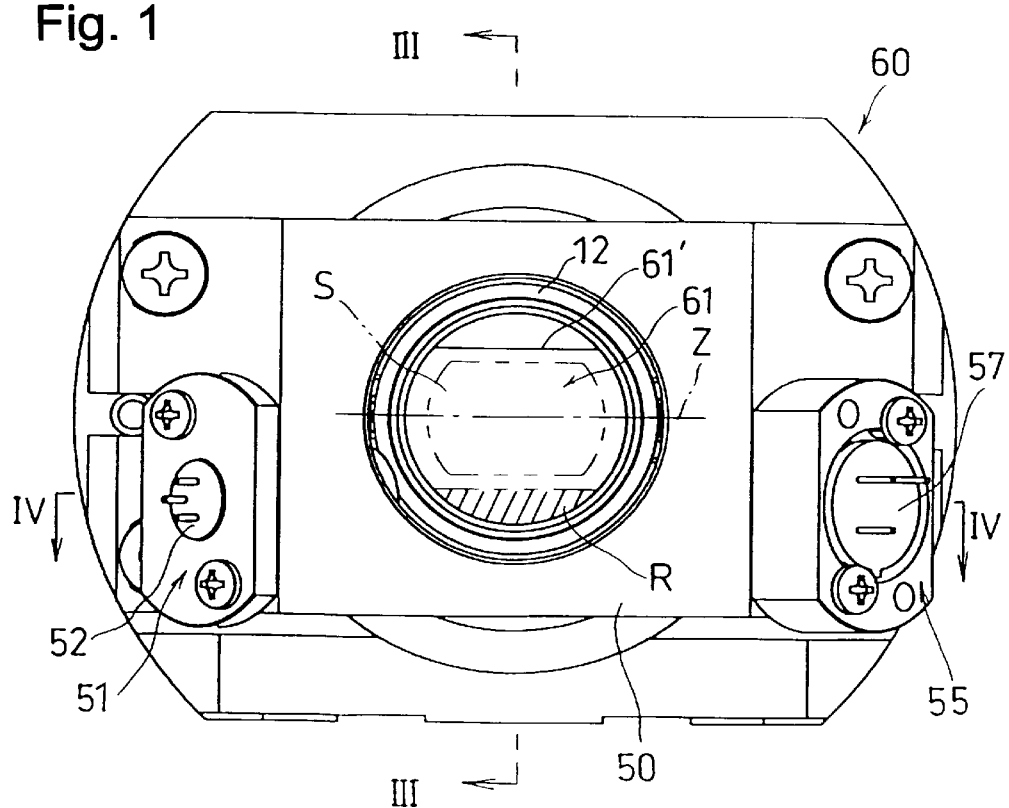
FIG. 1 is a front elevational view of a scanning position correcting apparatus in an optical scanner and a position sensor for a transmission type optical deflector according to an embodiment of the present invention.
Figure 2:
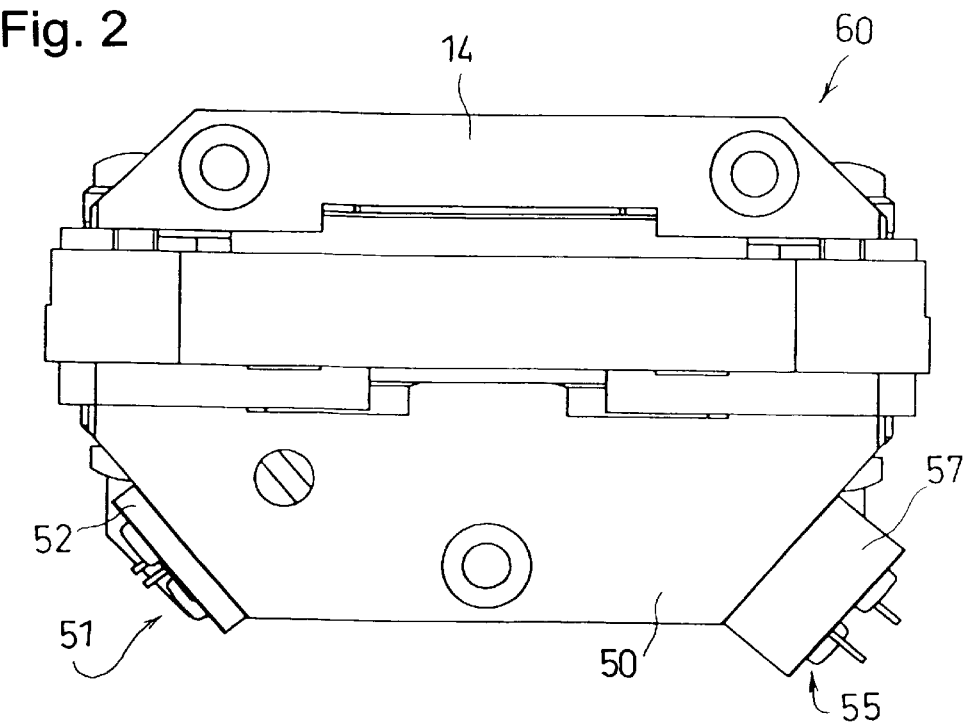
FIG. 2 is a plan view of FIG. 1.
Figure 3:
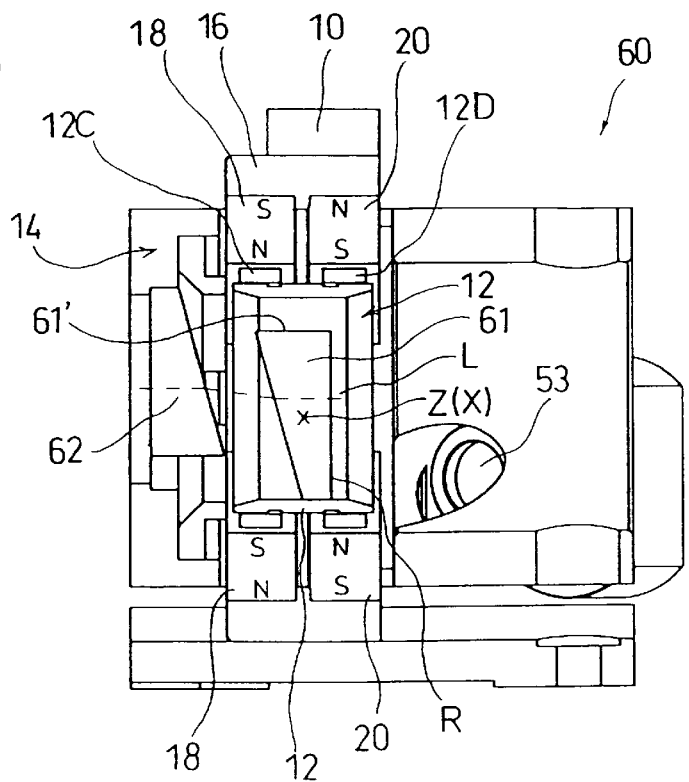
FIG. 3 is a sectional view taken along the line III—III in FIG. 1.
Figure 4:
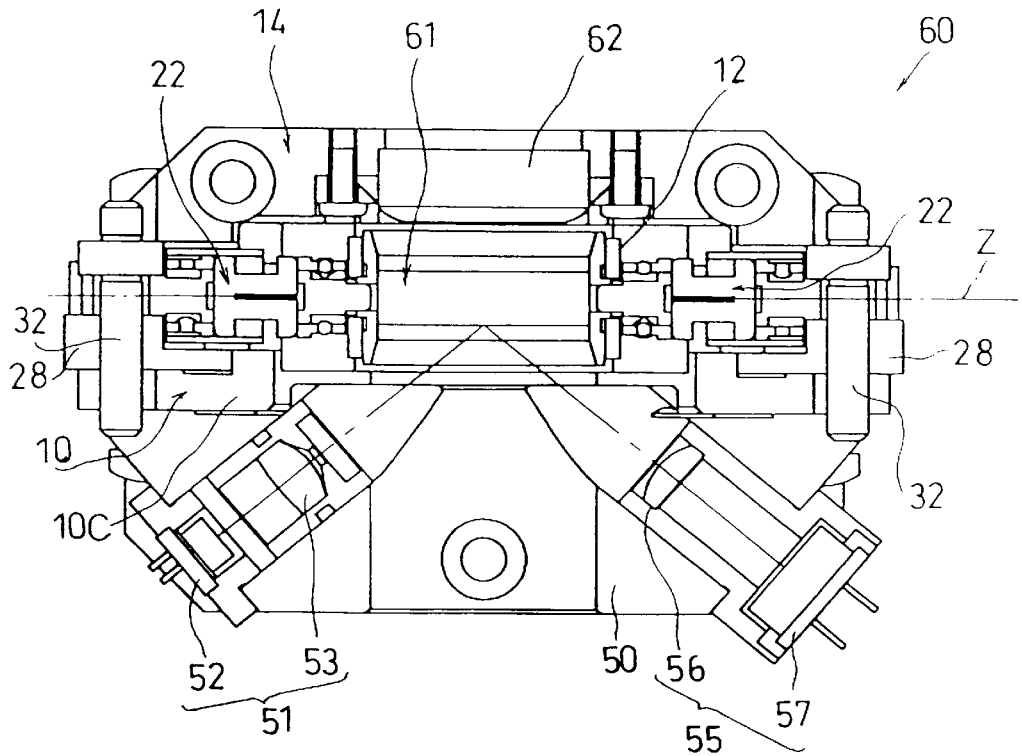
FIG. 4 is a sectional view taken along the line IV—IV in FIG. 1.
Figure 16:
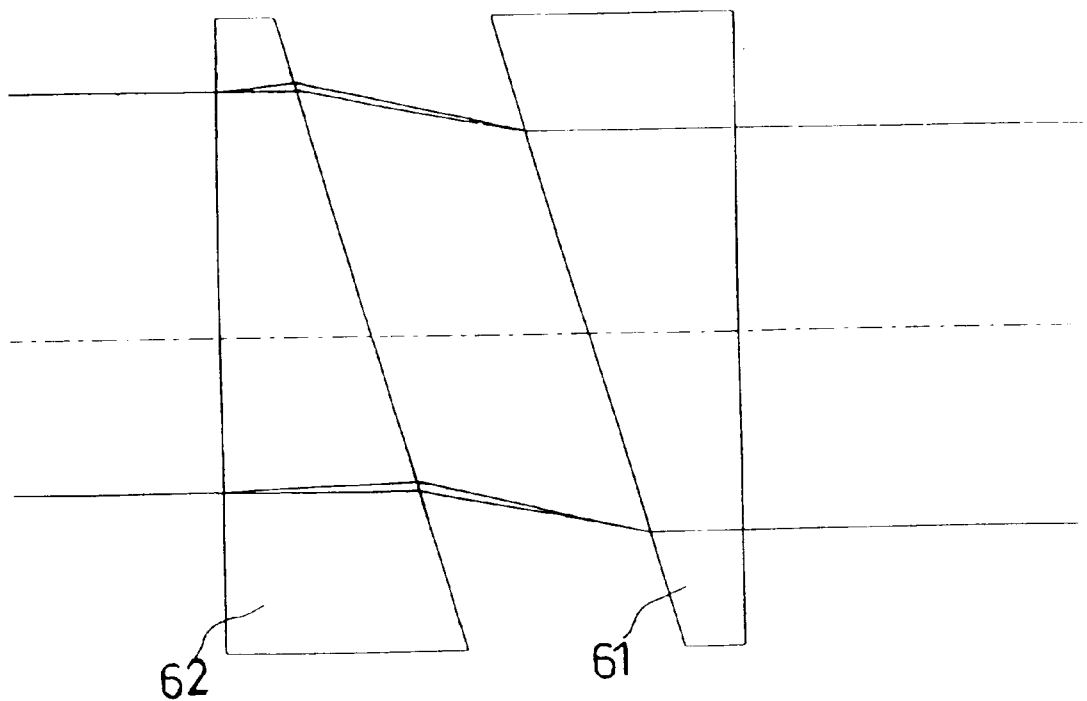

The stationary transmission prism 62 is secured to the cover member 14 integral with the yoke member 10. As can be seen in FIGS. 3 and 16, the stationary transmission prism 62 has the same wedge shape as the rotatable transmission prism 61. The apex portion of the wedge shaped prism 62 is oriented in the direction opposite to the apex portion of the prism 61. Namely, the thickness of the stationary transmission prism 62 is increased toward the lower end thereof in the sub-scanning direction. When the laser light is transmitted through the identical wedge-shaped prisms 61 and 62 of the same material (refractive index) that are oriented in opposite directions, the chromatic aberration caused in the first prism is canceled by the second prism, and hence the transmission deflector 60 is free from chromatic aberration.

The prism holder 12 is provided on the outer peripheral surface thereof with a pair of independent coils 12C and 12D secured thereto. The identical coils 12C and 12D are symmetrically arranged on opposite sides of a plane perpendicular to the center axis of the coils and including the Z-axis.

The yoke member 10 is provided, on the inner surface of the cylindrical portion 10C thereof, with a pair of split permanent magnets 18 and 20 secured thereto, each consisting of a pair of semi-circular (semi-annular) magnet segments. The front and rear permanent magnets 18 and 20 are arranged on opposite sides of a plane perpendicular to the center axis of the coils and including the Z-axis, corresponding to the coils 12C and 12D. A pair of permanent magnet segments 18 are secured to the yoke member 10 through the magnet holder 16 and have opposite polarities. Likewise, a pair of permanent magnet segments 20 have opposite polarities. Namely, one of the magnet segments 18 or 20 possesses a south polarity (S-polarity) at the inner peripheral side and a north polarity (N-polarity) at the outer peripheral side. The other magnet segment 18 or 20 possesses a north polarity (N-polarity) at the inner peripheral, side and a south polarity (S-polarity) at the outer peripheral side. Also, the polarities of the front and rear permanent magnets 18 and 20 that are located on opposite sides of the plane perpendicular to the center axis of the coils 12C and 12D and including the Z-axis are opposite to each other.

With the polarity distribution of the permanent magnets as mentioned above, the prism holder 12 is rotated about the axis Z in the forward or reverse direction, when electric current is given to the coils 12C and 12D in opposite directions. When the rotation of the prism holder 12 about the axis Z occurs, the light L incident upon and refracted by the rotatable transmission prism 61 is deflected in accordance with the rotational angle thereof. Since the center of gravity X of the rotatable transmission prism 61 is located on the principal axis Z, there is no energy loss produced by the rotation of the prism holder 12. Moreover, there is no weight imbalance with respect to the center of rotation, and hence no oscillation due to weight imbalance occurs. Consequently, the prism holder can be precisely driven at high speed.

In addition to the foregoing, if the electric current passes in the coils 12C and 12D in opposite directions, mutual inductance of the coils can be reduced. Furthermore, since the polarities of the permanent magnets 18 and 20 are opposite, so that when the electric current flows in the coils 12C and 12D in opposite directions, the rotational force in the same direction is produced in the prism holder 12, the magnetic circuit constituted by the permanent magnets 18 and 20 and the yoke member 10 tends not to be saturated. Consequently, it is possible to make the yoke member 10 (cylindrical portion 10C) thinner.

The position sensor is adapted to detect the angular displacement of the rotatable transmission prism 61 caused by the rotation of the prism holder 12. The rotatable transmission prism 61 is provided with a reflection layer R (hatched in FIG. 1) coated on the surface of the thinner portion of the prism 61 located out of (below) the effective area (laser transmission area) S. The casing 50 integral with the yoke member 10 is provided with a light emitter 51 which obliquely emits the laser beam onto the reflection layer R and an incident position detector 55 which receives the laser beam emitted from the light emitter and reflected by the reflection layer R. The emitter 51 is composed of a laser diode 52 and a collimating lens 53 which collimates the laser beam emitted from the laser diode 52. The incident position detector 55 is composed of a condenser lens 56 which condenses the laser beams reflected by the reflection layer R and a PSD (Position Sensing Device) 57 which receives the reflected light.

The emitter 51 and the position detector 55 are placed so that the laser beam emitted from the laser diode 52 is reflected by the reflection layer R of the rotatable transmission prism 61 and made incident upon the PSD 57. The incident position upon the PSD 57 at which the light is incident thereupon when no electric current flows in the coils 12C and 12D corresponds to the reference position of the rotatable transmission prism 61. If the electric current passes in the coils 12C and 12D in opposite directions to rotate the prism holder 12, and accordingly the rotatable transmission prism 61 about the axis Z, the incident position upon the PSD 57 varies. The change in the incident position is represented by a change in the output of the PSD 57. Therefore, it is possible to prevent the quality deterioration due to the irregular rotation of the photosensitive drum 210 by feeding back the output of the PSD 57, for example, to the control system of the rotational movement of the photosensitive drum 210.

Note that in the embodiment, reflection layer R is on the incident surface of the rotatable transmission prism 61, however, the reflection layer R could also be provided on the emission surface.

Figure 11:
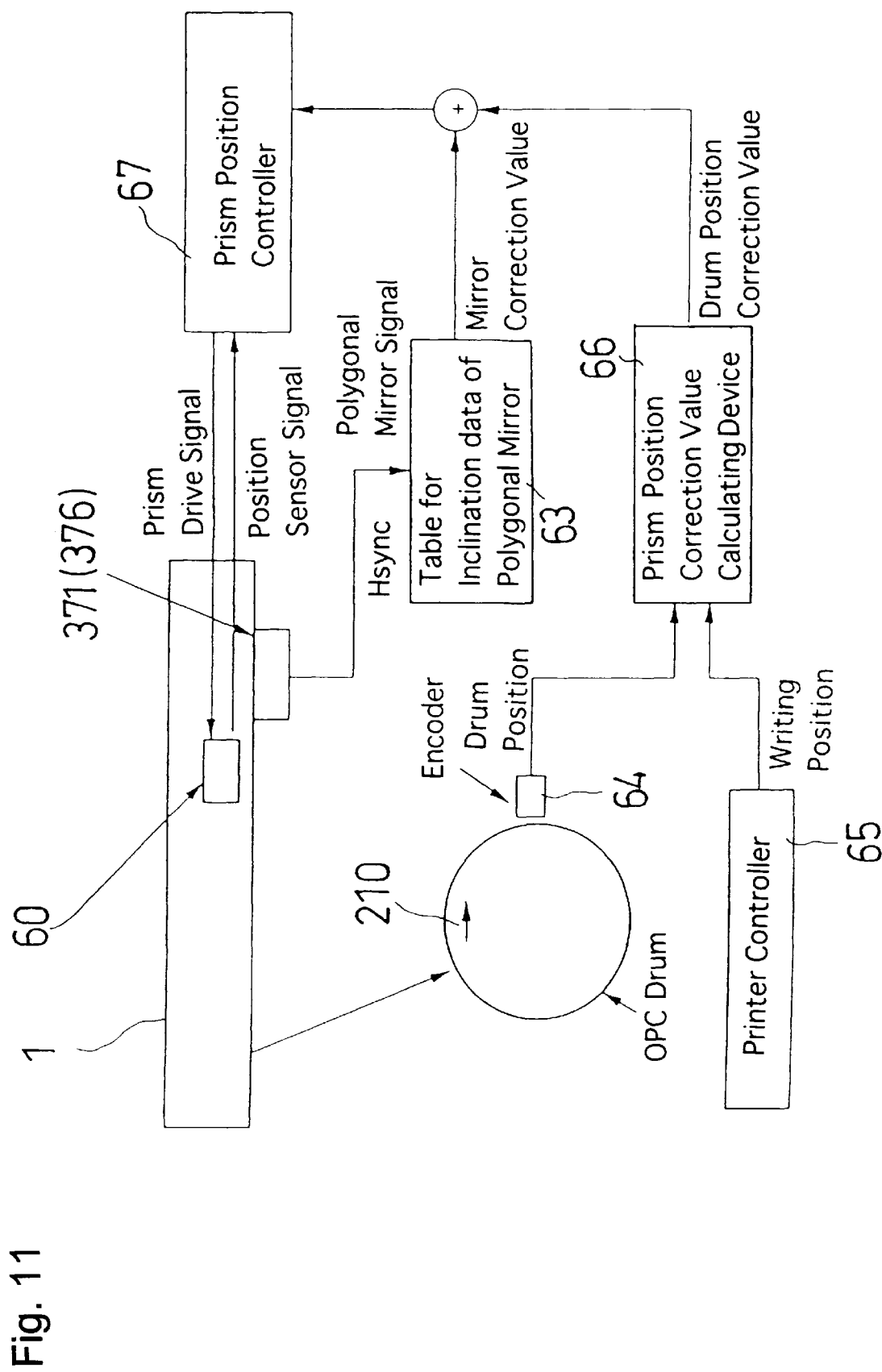
FIG. 11 is a block diagram of a control system for a scanning position correcting apparatus in an optical scanner and a transmission type optical deflector having a position sensor, according to an embodiment of the present invention.

FIG. 11 shows the controller of the optical scanner having the transmission deflector 60 which has been discussed above with reference to FIGS. 12 through 15. The casing 1 houses therein the elements discussed above with reference to FIGS. 12 through 15. The light transmitted through the transmission deflector 60; reflected by the polygonal mirror 180; transmitted through the fθ lens 190; and reflected by the reflection mirror 200 is made incident upon the photosensitive drum 210. The polygonal mirror motor 371 for the polygonal mirror 180 is provided with the sensor block 376 having the index sensor which generates one pulse (Hsync signal) for each rotation of the polygonal mirror 180, as mentioned above. The amount of inclination of each mirror surface of the polygonal mirror 180 is measured and stored in advance in a memory 63 as inclination data for each mirror surface. Consequently, the actual amount of inclination of the mirror surface of the polygonal mirror 180 which is being used for scanning is calculated and output based on the stored inclination data and the Hsync signal. Thus, the mirror correction value (of the polygonal mirror) is obtained.

The angular position of the photosensitive drum 210 is detected by an encoder 64 whose output signal is supplied together with the writing position signal (drawing signal) output from a printer controller 65, to a prism position correction value calculating device 66. The prism position correction value calculating device 66 calculates the correction value (angular displacement) of the rotatable transmission prism 61. Thus, the drum correction value (of the photosensitive drum) is obtained.

A prism position controller 67 controls the amount of electric current passing in the coils 12C and 12D in accordance with the mirror correction value and the drum-correction value and supplies a drive signal to the electromagnetically driven transmission deflector 60. Simultaneously, the prism position controller 67 receives a position signal of the prism which makes the light emitted from the emitter 51 and reflected by the reflection layer R of the rotatable transmission prism 61 incident upon the incident position detector 55. Owing to the closed control loop, the angle of the rotatable transmission prism 61 is controlled to move the scanning beams in the sub-scanning direction if there is a slight irregularity of the rotational movement of the photosensitive drum 210.

Note that the position correction value in the sub-scanning direction on the photosensitive drum 210 by the rotatable transmission prism 61 is approximately 1 μm and the swing angle of the scanning beam is in the range of 0.1 to a few seconds. Thus, in the case of a multi-color printing in which the printing quality is considerably influenced by a slight irregularity in the rotational movement (slight positional deviation) of the photosensitive drum 210, the influence can be restricted. Since the emitter 51 illuminates the rotatable transmission prism 61 with the laser beams collimated by the collimating lens 53, the angular position of the rotatable transmission prism 61 can be correctly detected even if the movement of the rotatable transmission prism 61 other than the rotation, for example translation, occurs. Consequently, due to the synergistic effect with the PSD 57 provided in the incident position detector 55, high resolution and response can be obtained.

The detail of the transmission deflector 60 which drives the rotatable transmission prism 61 will be discussed below with reference to FIGS. 5 through 10.

The base member 10 is composed of a bed 10A and an upright frame portion 10B integral with the bed 10A. The base member 10 functions as a mount which can be used when it is incorporated in an optical system. The frame member 10B is an annular member which defines a circular opening 10C. The prism holder 12 which is in the form of a short cylinder is disposed within the circular opening 10C of the annular frame member 10B (i.e., within the cylindrical portion) and is supported by the frame portion 10B through the elastic member 22.

A substantially rectangular cover 14 can be attached to the front end of the base member 10. The cover 14 is provided with a circular opening 14A at the center portion thereof. The transmission prism 62 is secured to the circular opening 14A. A permanent magnet holder 16 can be attached to the rear end of the base member 10. The holder 16 is composed of a holder body 16A in the form of a short cylinder and a pair of mount plates 16B which extend in the radial direction from the holder body 16A. A pair of split permanent magnets 18 and 20 which are provided on opposite sides of a plane including the axis Z and perpendicular to the center axis of the coils 12C and 12D are disposed in the holder body 16A. The polarity distribution of the permanent magnets 18 and 20 is the same as that shown in FIG. 3. Namely, one of the magnet segments 18 or 20 possesses a south polarity (S-polarity) at the inner peripheral side and a north polarity (N-polarity) at the outer peripheral side. The other magnet segment 18 or 20 possesses a north polarity (N-polarity) at the inner peripheral side and a south polarity (S-polarity) at the outer peripheral side. Also, the polarities of the front and rear permanent magnets 18 and 20 are opposite to each other.

The mount plates 16B are adapted to mount the magnet holder 16 to the frame 10B of the base member 10. Upon mounting the magnet holder 16, the holder body 16A is received in the circular opening 10C of, the frame member 10 to surround the permanent magnets 18 and 20, each consisting of a pair of magnet segments. The cover 14 and the holder 16 are preferably made of the same material as the base member 10.

Figure 6:
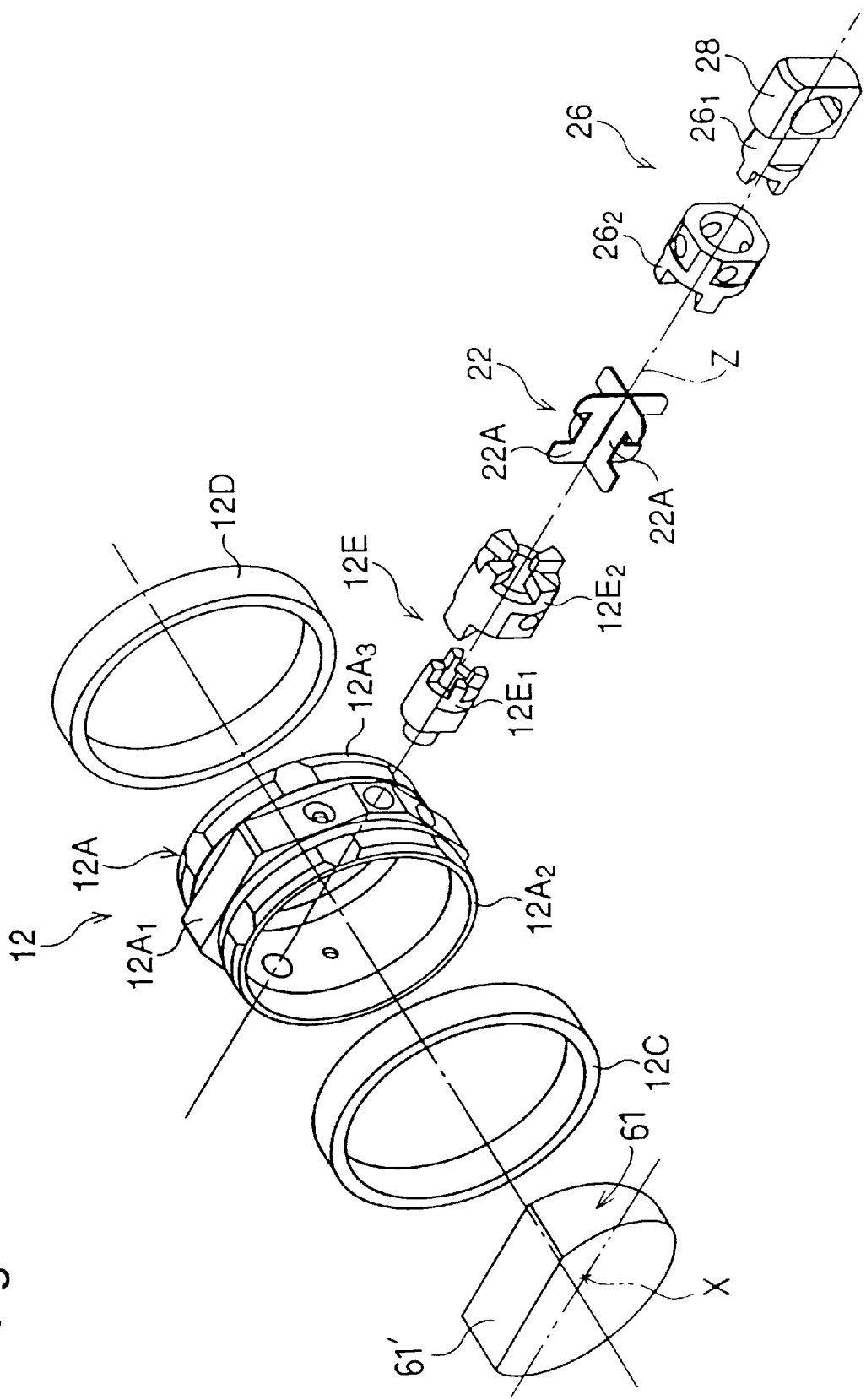
FIG. 6 is an exploded perspective view of a prism holder of an apparatus shown in FIG. 5.

Looking at FIG. 6 which shows an exploded perspective view of the prism holder 12, the prism holder 12 is provided with a deflector holding element 12A in the form of a short cylinder and the rotatable transmission prism 61 provided in the holding element 12A.

As shown in FIG. 6, the holding element 12A constitutes a center polygonal flange portion 12A1 and collars 12A2 and 12A3 which project from the opposite ends of the center flange portion 12A1. The prism holder 12 is also provided with coils 12C and 12D attached to the collars 12A2 and 12A3 of the holder member 12A. The coils 12C and 12D in which electric currents can flow independently cooperate with the permanent magnets 18 and 20 and serve as a drive means for driving the prism holder 12. The coils 12C and 12D which are annular in FIG. 6 can be made of conductors wound in the form of a ring. No power supply lead for coils 12C and 12D is shown in the drawings.

The prism holder 12 is also provided with leaf spring couplings 12E attached to the diametrically opposed sides of the center flange portion 12A1 of the deflector holder member 12A. Note that in FIG. 6, only one coupling 12E is shown. The couplings 12E are each composed of a securing coupling portion 12E1 which is secured to the center flange portion 12A1 and a detachable coupling portion 12E2 which is detachably attached to the securing coupling portion 12E1.

Figure 7:
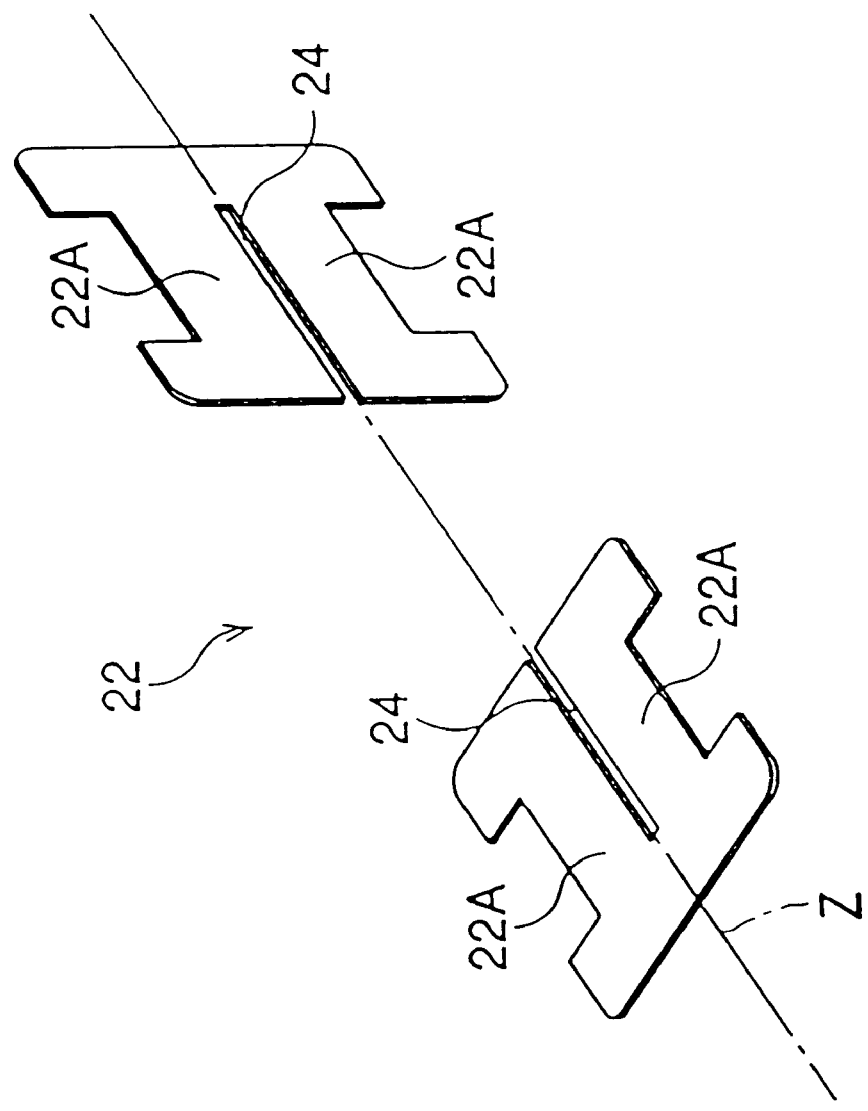
FIG. 7 is an exploded perspective view of a composite leaf spring body (elastic member) which supports a prism holder shown in FIG. 6.

The composite leaf spring body (elastic member) 22 is connected to each coupling 12E. The composite leaf spring body 22 is composed of four leaf spring elements 22A in the illustrated embodiment. As can be seen in FIG. 7, a generally H-shaped plate is provided with a slit 24 which splits the plate into two identical halves which are interconnected at their one end, so that a pair of leaf spring elements 22A are formed. Two of the generally H-shaped plates are assembled in such a way that the plates lie in orthogonal planes and the slits are inserted into one another. Consequently, the composite leaf spring body (elastic member) 22 as shown in FIG. 8 in which the four leaf spring elements 22A are spaced at an equi-angular distance of 90 degrees about the longitudinal axis of the slits 24 can be obtained.

Figure 5:
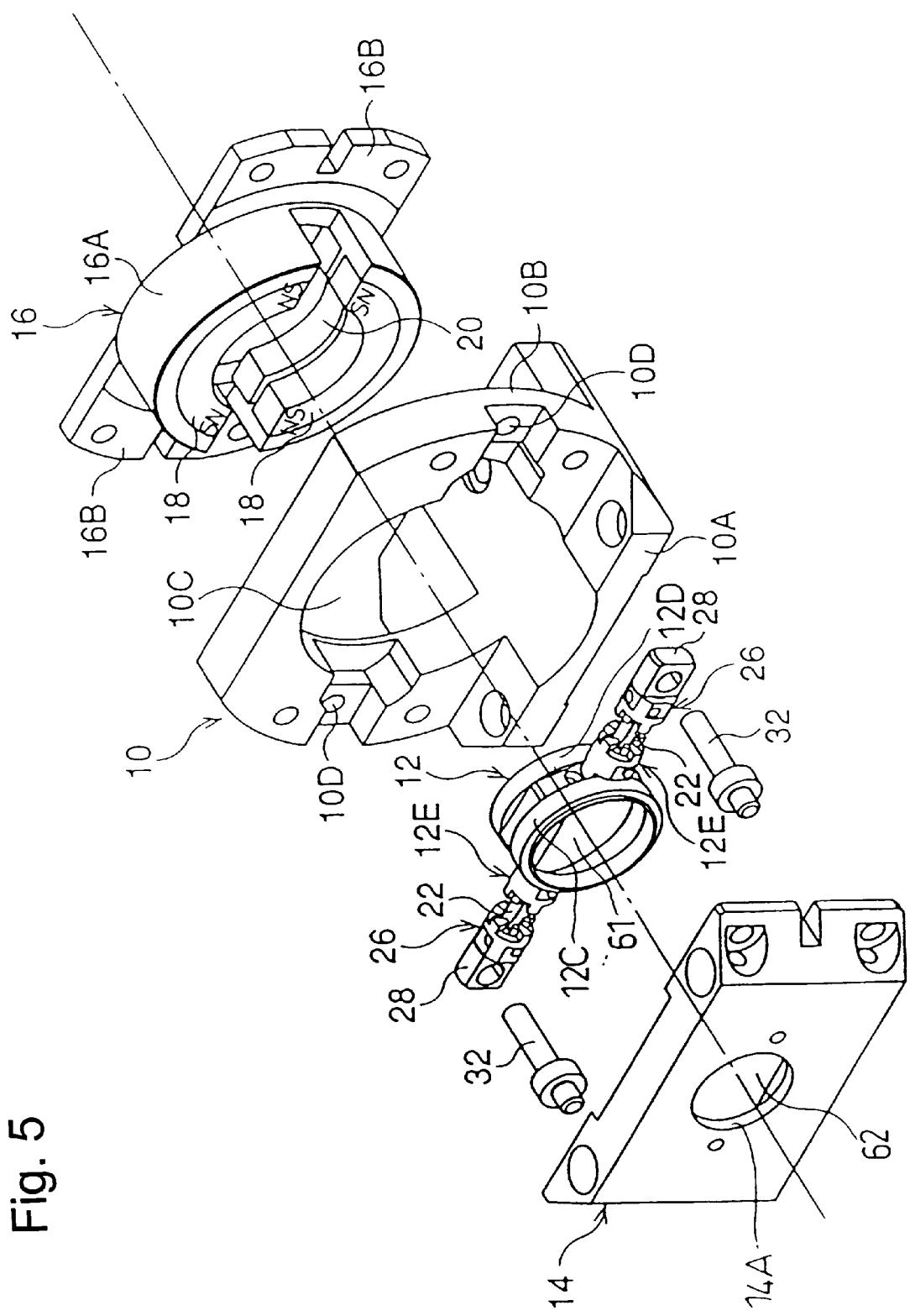
FIG. 5 is an exploded perspective view of an electromagnetic drive unit for a scanning position correcting apparatus (transmission type optical deflector) shown in FIG. 1.

As can be seen in FIG. 5, a second leaf spring coupling 26 is provided on the end of the first leaf spring coupling 12E away from the prism holder 12. The second leaf spring coupling 26 is composed of a securing coupling portion $26_1$ which is secured to the frame portion 10B of the base member 10 and a detachable coupling portion $26_2$ which is detachably attached to the securing coupling portion $26_1$. The second leaf spring coupling 26 is substantially the same as the first leaf spring coupling 12E except for the point that the securing coupling portion $26_1$ is integrally connected to a mounting block piece 28 having a through hole.

Figure 8:
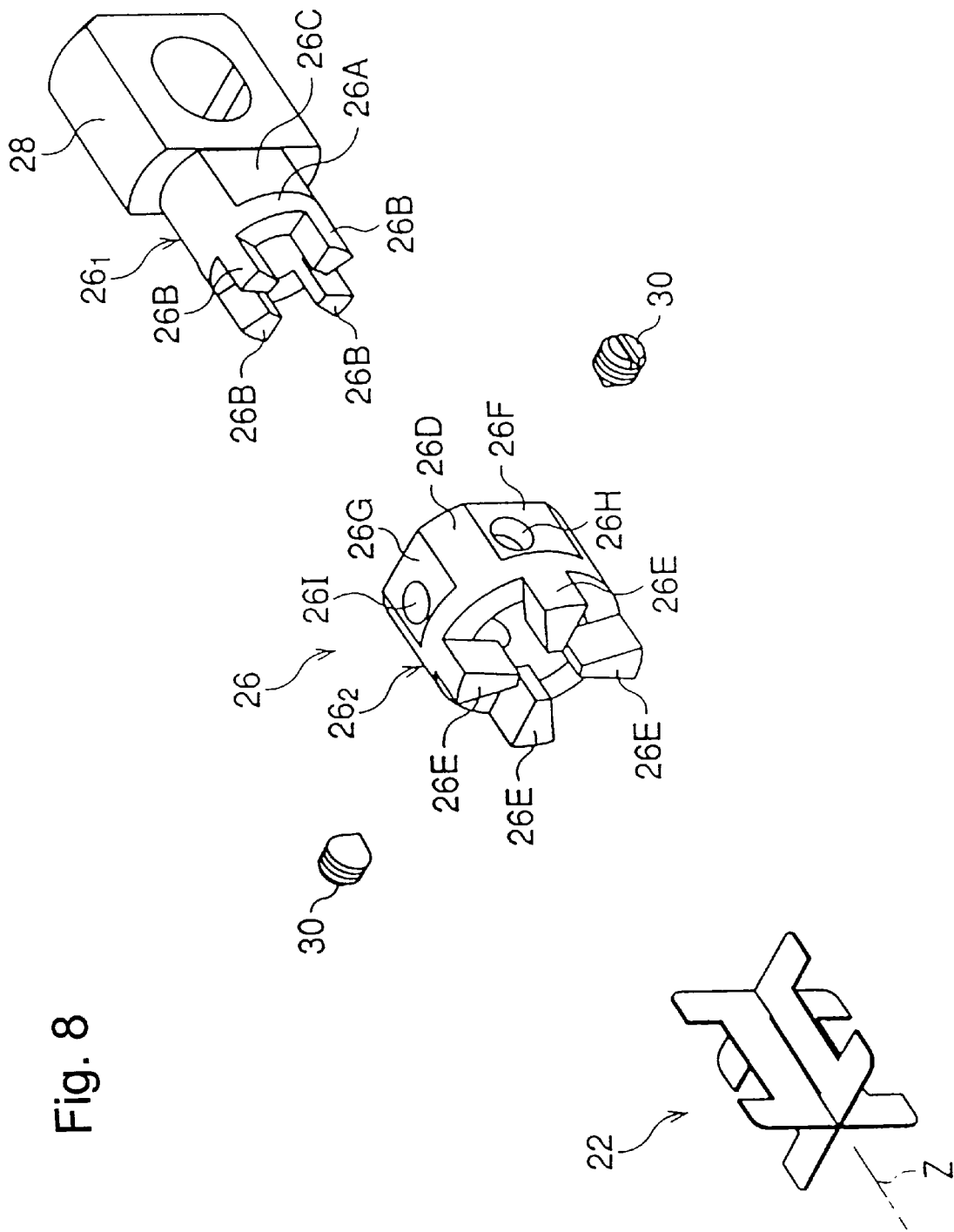
FIG. 8 is an exploded perspective view of a coupling for connecting a composite leaf spring bbdy shown in FIG. 7.

As shown in FIG. 8, the securing coupling portion $26_1$ is made of a short tubular shaft 26A which protrudes from the mounting block piece 28 and which is provided with four projections 26B projecting from the free end of the tubular shaft 26A. The four projections 26B are circumferentially spaced from one another at an equi-angular distance of 90 degrees about the center axis of the tubular shaft 26A. Each of the projections 26B has a segmental cross sectional shape, as can be seen in FIG. 8. The shaft portion 26A is provided on the peripheral surface thereof with a pair of flat surface portions 26c which are diametrically opposed. Note that only one flat surface portion 26C is shown in FIG. 8.

Figure 9:
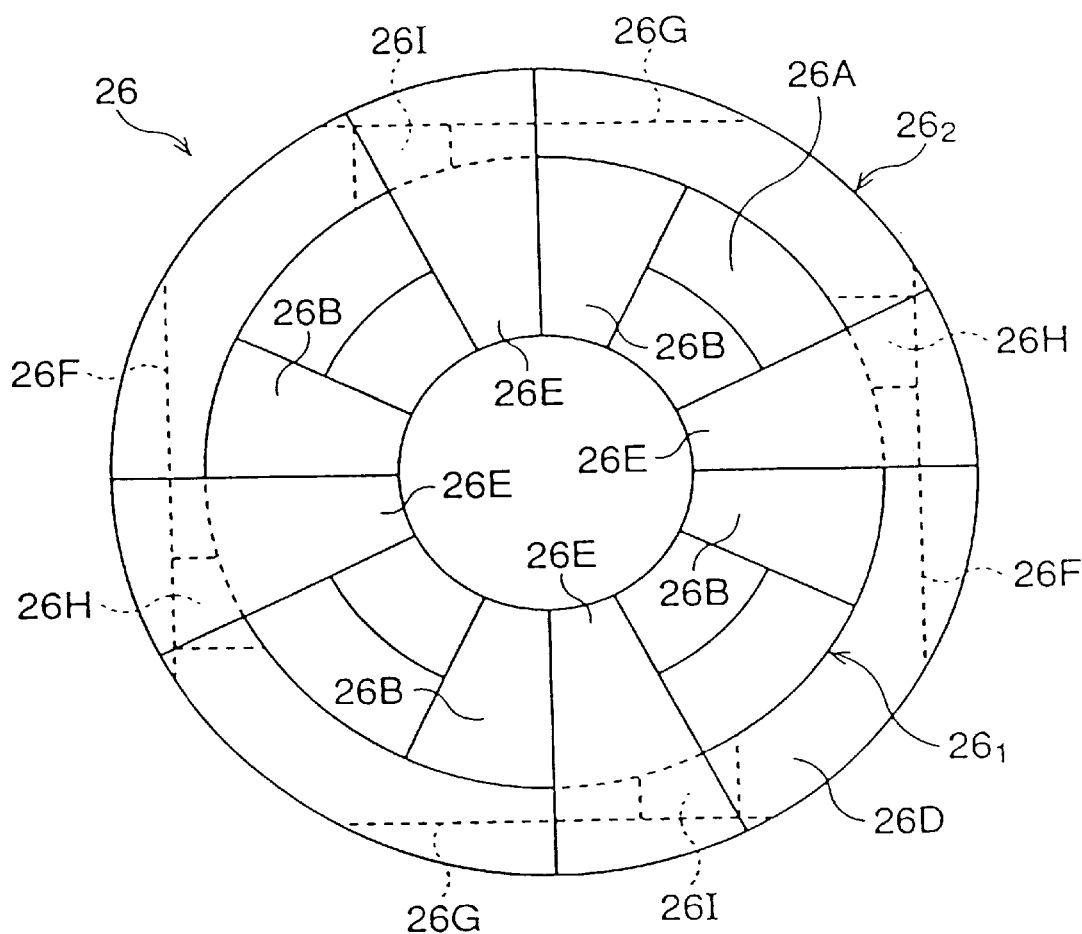
FIG. 9 is an end view of a coupling for a leaf spring, shown in FIG. 8.
Figure 10:
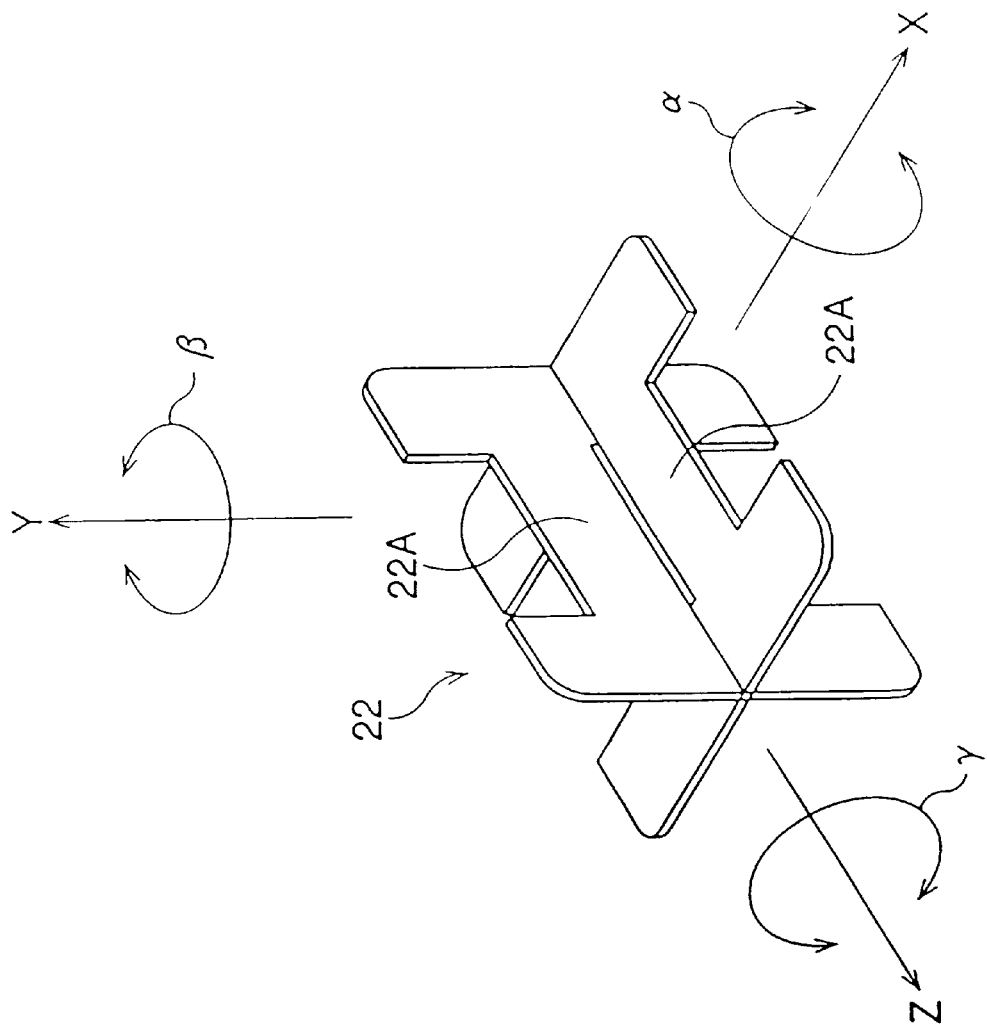
FIG. 10 is an explanatory perspective view of a composite leaf spring body shown in FIG. 7, in an assembled state.

The detachable coupling portion $26_2$ is in the form of a short tubular shaft 26D whose diameter is larger than that of the tubular shaft 26A, so that the tubular shaft 26A can be loosely fitted in the shaft portion 26D. The shaft portion 26D is provided with four projections 26E projecting from the one end of the tubular shaft 26D. The four projections 26E are circumferentially spaced from one another at an equiangular distance of 90 degrees about the center axis of the tubular shaft 26D. Each of the projections 26E has a segmental cross sectional shape, as can be seen in FIG. 8. The shaft portion 26D is provided on the peripheral surface thereof with two pairs of flat surface portions 26F and 26G which are diametrically opposed, as shown in FIG. 9. Note that only one flat surface portion 26F and only one flat surface portion 26G are shown in FIG. 8.

As may be seen in FIG. 9, the flat surfaces 26F and 26G are respectively provided with threaded holes 26H and 26I. Each pair of threaded holes 26H or 26I are deviated in opposite directions with respect to the longitudinal center axis of the shaft portion 26D. Namely, in an embodiment illustrated in FIGS. 8 and 9, the threaded hole 26H formed in the flat surface 26F appearing in FIG. 8 is deviated in the counterclockwise direction as viewed from the side of the four projections 26E of the shaft portion 26D. Likewise, the threaded hole 26H formed in the other flat surface 26F (FIG. 9) diametrically opposed to the is first-mentioned flat surface 26F is deviated also in the counterclockwise direction. The same is true for the pair of threaded holes 26I formed in the pair of flat surfaces 26G, as may be seen in FIG. 9.

Consequently, when a pair of screws 30 (FIG. 8) are screwed in the corresponding threaded holes 26H after the detachable coupling portion $26_2$ is connected to the securing coupling portion $26_1$ by engaging the projection 26B with the projections 26E as shown in FIG. 9, the front end of the screws 30 abut against the flat surface portions 26C of the securing coupling portion $26_1$. Further fastening of the screws 30 gives a rotation force to the securing coupling portion $26_1$ and the detachable coupling portion $26_2$ in opposite directions, so that the engaging surfaces of the adjacent projections 26B and 26E are pressed against each other. If the above-mentioned fastening operation of the pair of screws 30 is carried out while the ends of the spring elements 22A of the composite leaf spring body 22 are held between the adjacent projections 26B and 26E, the composite leaf spring body 22 is secured to the leaf spring coupling 26.

As mentioned above, the structure of the leaf spring coupling 26 is the same as that of the leaf spring coupling 12E and hence the composite leaf spring body 22 is secured to the leaf spring coupling 12E in the similar way as the leaf spring coupling 26.

The assembly of the prism holder 12 is shown in FIG. 5, in which each composite leaf spring body 22 is secured at one end to the pair of leaf spring couplings 12E and is secured at the other end to the pair of leaf spring couplings 26. Bolts 32 are inserted in the through holes of the mounting block pieces 28 of the securing coupling portions $26_1$ of the leaf spring couplings 26 and are screwed in diametrically opposed threaded holes 10D of the frame 10B of the base member 10. As may be understood from FIG. 5, the threaded holes 10D are formed in recessed portions formed on the frame portion 10B, so that when the mounting block pieces 28 are secured by the bolts 32, the mounting block pieces 28 can be received in the corresponding recessed portions.

Thus, the prism holder 12 is held by the frame portion 10B of the base member 10 through the pair of composite leaf spring bodies 22. In this state, the prism holder 12 can be most easily rotated about the longitudinal center axis of the leaf spring couplings 12E and 26, i.e., the longitudinal center axis of the composite leaf spring bodies 22. Namely, in three dimensional coordinates shown in FIG. 10, in which the origin is located at the center of the composite leaf spring body 22 and wherein one pair of leaf spring elements 22A lie in an X–Z plane and the other pair of leaf spring elements 22A lie in a Y–Z plane, the compliance ($\alpha$) about the X-axis is substantially identical to the compliance ($\beta$) about the Y-axis and is considerably greater than the compliance ($\gamma$) about the Z-axis. In short, with the composite leaf spring body 22, the small compliance ($\gamma$) is obtained only about the Z-axis.

If the electric current flows in the coils 12C and 12D of the prism holder 12 within the magnetic field produced by the two pairs of split permanent magnet segments 18 and 20, the prism holder 12 receives a rotational force about the Z-axis due to the left-hand rule. The direction of the rotation depends on the direction of the current flowing in the coils 12C and 12D. Thus, the Z-axis is the axis or rotation of the prism holder 12, i.e., the principal axis.

As may be understood from the foregoing, with the composite leaf spring body 22 constructed as above, the low compliance takes place only about the principal axis (Z-axis) of the prism holder 12, and hence if an external force such as an external oscillation is applied to the optical deflector during the driving of the prism holder 12, the latter can stably rotate only about the principal axis (Z-axis).

In particular. since the center of gravity X of the rotatable transmission prism 61 (i.e., the center of gravity of the prism holder 12) is located on the principal axis (Z-axis), it is possible to effectively prevent an occurrence of a coupled oscillation at the prism holder 12.

According to the present invention, as mentioned above, the rotatable transmission prism 61 which is rotatably supported by the yoke member (base member 10) through the elastic member is provided, on the portion out of the effective area (laser transmission area), with a reflection layer coated thereon, and the case member 14 integral with the yoke member is provided with the emitter (laser diode 52 and the collimating lens 53) for emitting the collimated beams onto the reflection layer and the incident position detector (condenser lens 56 and the PSD 57) which receives the light reflected by the reflection layer to detect the incident position. Hence, the position of the rotatable transmission prism 61 can be easily detected by a simple detection mechanism. It is possible to provide the emitter and the incident position detector on the yoke member. Note that the transmission deflector using the position sensor according to the present invention can be applied to an apparatus other than the scanner of the illustrated embodiment.

Moreover, in the present invention, the rotatable transmission prism 61 whose cross section in the sub-scanning direction has a wedge-shape is provided in the light path between the laser source and the polygonal mirror 180, and the identical wedge-shaped stationary transmission prism 62 whose direction is opposite to the rotatable transmission prism is provided in the light path. With this arrangement, not only can the scanning position in the sub-scanning direction be corrected by rotating the rotatable transmission prism 61 about the axis perpendicular to the scanning direction, but also chromatic aberrations can be eliminated or reduced by the stationary transmission prism 62.

As can be understood from the above discussion, in a position sensor applied to a transmission deflector using a prism, according to the present invention, the position of the prism can be reliably detected. Moreover, in the scanning position correction apparatus according to the present invention, the scanning position in the sub-scanning direction can be corrected by the transmission deflector. Furthermore, since the occurrence of chromatic aberrations is restricted, there is more freedom of design of the structure of the scanning optical system.

What is claimed is:

1. A scanning position correcting apparatus for an optical scanning system, comprising:

a laser source that emits a laser light;

an optical deflector which moves the laser light emitted from said laser source in a main scanning direction;

a photosensitive body which is driven in a sub-scanning direction perpendicular to said main scanning direction and which receives said laser light moved in said main scanning direction;

a pair of wedge-shaped transmission prisms provided in a light path between said laser source and said optical deflector, said wedge-shaped transmission prisms having a wedge shape in section in said sub-scanning direction and being oriented in opposite directions, one of said wedge-shaped transmission prisms being stationary and the other wedge-shaped transmission prism being rotatable about a principle axis perpendicular to said sub-scanning direction; and an electromagnetic drive device which rotates said rotatable transmission prism about said principle axis, wherein said rotatable wedge-shaped transmission prism is partly cut away at a thicker portion so that the center of gravity of said rotatable wedge-shaped transmission prism is substantially the same as said principal axis thereof in a section in which said principal axis appears as a point and said rotatable transmission prism appears as a wedge-shape.

2. A scanning position correcting apparatus for an optical scanning system, according to claim 1, wherein said electromagnetic drive device comprises:

a yoke member;

a prism holder which is supported by said yoke member to rotate about said principal axis through an elastic member and on which said rotatable transmission prism is provided; and a coil and a permanent magnet provided on said prism holder and said yoke member, respectively, to produce rotational motion of said prism holder in the forward and reverse directions about said principal axis via electromagnetic operation; and wherein said stationary transmission prism is secured to said yoke member or a member integral therewith.

3. A scanning position correcting apparatus for an optical scanning system, according to claim 1, wherein said electromagnetic drive device drives said rotatable transmission prism in accordance with data on the irregular movement of said photosensitive body.

4. A scanning position correcting apparatus for an optical scanning system, according to claim 1, wherein said optical deflector comprises a polygonal mirror and wherein said electromagnetic drive device drives said rotatable transmission prism in accordance with inclination data of the reflection surfaces of said polygonal mirror.

5. A scanning position correcting apparatus for an optical scanning system, according to claim 1, wherein said stationary transmission prism and said rotatable transmission prism have substantially the same wedge shape.

* * * * *